(12) United States Patent
Yang et al.

(10) Patent No.: US 9,244,983 B2
(45) Date of Patent: Jan. 26, 2016

(54) PLATFORM FOR CONTINUOUS GRAPH UPDATE AND COMPUTATION

(75) Inventors: Fan Yang, Beijing (CN); Lidong Zhou, Beijing (CN); Ming Wu, Beijing (CN); Aapo Kyrola, Pittsburgh, PA (US); Raymond Cheng, Matamoras, PA (US); Youshan Miao, Beijing (CN); Xuetian Weng, Beijing (CN); Ji Hong, Sichuan (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/520,628

(22) PCT Filed: Apr. 5, 2012

(86) PCT No.: PCT/CN2012/073529
§ 371 (c)(1),
(2), (4) Date: Jul. 5, 2012

(87) PCT Pub. No.: WO2013/149381
PCT Pub. Date: Oct. 10, 2013

(65) Prior Publication Data
US 2015/0154262 A1    Jun. 4, 2015

(51) Int. Cl.
*G06F 17/30* (2006.01)
*G06F 11/14* (2006.01)

(52) U.S. Cl.
CPC ...... *G06F 17/30516* (2013.01); *G06F 11/1451* (2013.01); *G06F 17/30958* (2013.01)

(58) Field of Classification Search
CPC .............. G06F 17/30958; G06F 17/30516; G06F 11/1451

USPC .......................................................... 707/649
See application file for complete search history.

(56) References Cited

U.S. PATENT DOCUMENTS

| | | | | |
|---|---|---|---|---|
| 7,593,341 | B1 * | 9/2009 | Buriol et al. .................. | 370/238 |
| 8,001,157 | B2 * | 8/2011 | Bier .............................. | 707/802 |
| 8,739,016 | B1 * | 5/2014 | Goldman et al. ............. | 715/200 |
| 2004/0090472 | A1 * | 5/2004 | Risch et al. ................... | 345/853 |
| 2005/0256892 | A1 * | 11/2005 | Harken ......................... | 707/101 |

(Continued)

OTHER PUBLICATIONS

Aggarwal, "Social Network Data Analytics", Retrieved on: Dec. 29, 2011, Available at: http://charuaggarwal.net/socialtoc.pdf, Book, 1st edition, 2011, Chapter 1, An Introduction to Social Network Data Analytics, 28 pgs.

(Continued)

*Primary Examiner* — Rehana Perveen
*Assistant Examiner* — Tiffany Thuy Bui
(74) *Attorney, Agent, or Firm* — Heikki Einola; Judy Yee; Micky Minhas

(57) ABSTRACT

A continuous stream data (e.g., messages, tweets) is received by ingest nodes of a platform. The ingest nodes may analyze the data to create a transaction of graph updates, assign a sequence number to the transaction, and distribute the graph updates with the sequence number to graph nodes of the platform. The graph nodes may store graph updates from ingest nodes, and then the ingest nodes may report graph update progresses in a progress table. A snapshot may be taken based on the progress table, and then graph-mining computation may be implemented. Tolerate failures and decaying may be supported and incremental expansion may be allowed to cope with increasing update rates and computation needs.

20 Claims, 8 Drawing Sheets

(56) References Cited

U.S. PATENT DOCUMENTS

| | | | |
|---|---|---|---|
| 2006/0282474 A1* | 12/2006 | MacKinnon, Jr. | 707/200 |
| 2008/0281801 A1* | 11/2008 | Larson et al. | 707/4 |
| 2008/0300834 A1* | 12/2008 | Wiemer et al. | 345/440 |
| 2009/0171999 A1* | 7/2009 | McColl et al. | 707/101 |
| 2010/0121707 A1 | 5/2010 | Goeldi | |
| 2012/0131139 A1* | 5/2012 | Siripurapu et al. | 709/217 |
| 2012/0254102 A1* | 10/2012 | Li et al. | 706/58 |

OTHER PUBLICATIONS

Angles et al, "Survey of Graph Database Models", ACM Computing Surveys, vol. 40, No. 1, Article 1, Feb. 2008, 39 pgs.

Bhatotia et al, "Incoop: MapReduce for Incremental Computations", ACM Symposium on Cloud Computing, Oct. 2011, 14 pgs.

Bu et al, "HaLoop: Efficient Iterative Data Processing on Large Clusters", Proc 36th Intl Conf VLDB Sep. 2010, 14 pgs.

Burrows, "The Chubby Lock Service for Loosely-coupled Distributed Systems", Proc 7th Symposium on Operating Systems Design and Implementation, Nov. 2006, 16 pgs.

Cai, et al., "Mining Hidden Community in Heterogeneous Social Networks", In Proceedings of the 3rd International Workshop on Link Discovery, Aug. 21, 2005, pp. 58-65.

Carney et al, "Monitoring Streams: A New Class of Data Management Applications", Proc of 28th VLDB (Very Large Data Bases) Conf, Jan. 2002, 12 pgs.

Chandrasekaran et al, "TelegraphCQ: Continuous Dataflow Processing for an Uncertain World", Proc 2003 CIDR Conf, Jan. 2003, 12 pgs.

Chen et al, "NiagaraCQ: A Scalable Continuous Query System for Internet Databases", Proc ACM SIGMOD 2000 Intl Conf on Management of Data, vol. 29, Issue 2, Jun. 2000, pp. 379-390.

Cudre-Mauroux, et al., "Graph Data Management Systems for New Application Domains", In Proceedings of the VLDB Endowment, vol. 4, Issue 12, Aug. 29-Sep. 3, 2011, pp. 1510-1511.

Dean et al, "MapReduce: Simplified Data Processing on Large Clusters", Communications of the ACM, 51(1), Jan. 2008, pp. 107-113.

Ediger, et al., "Massive Social Network Analysis: Mining Twitter for Social Good", In Proceedings of 39th International Conference on Parallel Processing, Sep. 13-16, 2010, pp. 583-593.

Gunda et al, "Nectar: Automatic Management of Data and Computation in Datacenters", Proc 9th Symposium on Operating Systems Design and Implementation, Oct. 2010, 14 pgs.

He et al, "Comet: Batched Stream Processing for Data Intensive Distributed Computing ", ACM Symposium on Cloud Computing, Jun. 2010, 12 pgs.

Hunt et al, "Zookeeper: Wait-Free Coordination for Internet-Scale Systems", USENIX Annual Technical Conf, Jun. 2010, 14 pgs.

Kallman et al, "H-Store: A High-Performance, Distributed Main Memory Transaction Processing System ", Proc 34 Intl Conf on VLDB, 1(2), Aug. 2008, 4 pgs.

Kang et al, "Pegasus: A Peta-scale Graph Mining System", IEEE Intl Conf on Data Mining, Dec. 2009, pp. 229-238.

Kupferman, et al., "Parker: Storing the Social Graph", Retrieved on: Dec. 29, 2011, Available at: http://www.cs.ucsb.edu/~jkupferman/docs/Parker.pdf, Proceedings 4th Annual Graduate Student Workshop on Computing, Oct. 2009, 9 pgs.

Lamport, "The Part-time Parliament", ACM Transactions on Computer Systems, 16(2), May 1998, 33 pgs.

Logothetis et al, "Stateful Bulk Processing for Incremental Analytics", ACM Symposium on Cloud Computing, Jun. 2010, 12 pgs.

Low et al, "GraphLab: A New Framework for Parallel Machine Learning", 26th Conf on Uncertainty in Artificial Intelligence, Jul. 2010, 10 pgs.

Malewicz et al, "Pregel: A System for Large-Scale Graph Processing", ACM SIGMOD PODS Conf (Intl Conf on management of Data), Jun. 2010, 11 pgs.

"Memcached: A Distributed Memory Object Caching System", retrieved Dec. 2001 at http://memcached.org/, 3 pgs.

Mukherjee, et al., "Graph-based Data Mining on Social Networks", In Proceedings of the ACM SIGKDD International Conference on Knowledge Discovery and Data Mining, Aug. 22-25, 2004, 10 pages.

"Neo4j: NOSQL for the Enterprise", 2011, The graphic database, accessed Dec. 2011 at http://neo4j.org/, 2 pgs.

Ongara et al, "Fast Crash Recovery in RAMCloud", 23rd ACM Symposium on Operating Systems Principles, Oct. 2011, 13 pgs.

Page et al, "The PageRank Citation Ranking: Bringing Order to the Web", Technical Report, Stanford University, Stanford, CA, Jan. 29, 1998, pp. 1-17.

Pearce et al, "Multithreaded Asynchronous Graph Traversal for In-Memory and Semi-External Memory", Intl Conf for High Performance Computing, Networking, Storage and Analysis, SuperComputing Nov. 2010, 11 pgs.

Peng et al, "Large-scale Incremental Processing using Distributed Transactions and Notifications", 9th USENIX Symposium on Operating Systems Design and Implementation, Oct. 2010, 14 pgs.

Popa et al, "DryadInc: Reusing Work in Large-scale Computations", Proc of 2009 Conf on Hot Topics in Cloud Computing, Jun. 2009, 5 pgs.

Power et al, "Piccolo: Building Fast, Distributed Programs with Partitioned Tables", 9th USENIX Symposium on Operating Systems Design and Implementation, Oct. 2010, pp. 1-14.

Romero et al, "Differences in the Mechanics of Information Diffusion Across Topics: Idioms, Political Hashtags, and Complex Contagion on Twitter", 20th Intl World Wide Web Conf, Mar. and Apr. 2011, pp. 695-704.

Sarma et al, "A Sketch-based Distance Oracle for Web-scale Graphs", Third ACM Intl Conf on Web Search and Data Mining, Feb. 2010, 10 pgs.

Sullivan, "Tweets about Steve Jobs Spike but Dont Break Twitter Peak Record", Oct. 2011, retrieved Dec. 2011 at http://searchengineland.com/tweets-about-steve-jobs-spike-but-dont-break-twitter-record, 10 pgs.

Tunkelang, "A Twitter Analog to PageRank", The Noisy Channel, Jan. 2009, retrieved Dec. 2011 at http://thenoisychannel.com/2009/01/13/a-twitter-analog-to-pagerank/, 15 pgs.

Corman et al, "Introduction to Algorithms", Second Edition, Book, MIT Press and McGraw-Hill, 2001.

Tanenbaum, "Distributed Operating Systems", Book, Prentiss Hall publishers, 1995.

* cited by examiner

600

```
1  ProcessTweet(tweet) {
2    foreach(word in tweet.text) {
3      if (word starts "@") {
4        mentionedUser = word[1:]
5        EmitOperations(createEdge, from: tweet.user, to: mentionedUser)
6      }
7    }
8  Initialize (vertex)
9  UpdateTunkRank(v) {
10     val newRankToPush = (1+p*v["tunkrank"]) /v.numOutEdges()
11
12     foreach(e in vertex.outEdges()) {
13       val prevSent = v.("tunkrank", e.target)
14       val delta = newRankToPush - prevSent
15       if (|delta| > threshold)
16       v.pushDeltaTo("tunkrank", e.target, delta)
17     }
18 }
19 Accumulator
20 Trigger(oldval, newval): abs(oldval-newval)>ε
```

PLATFORM FOR CONTINUOUS GRAPH UPDATE AND COMPUTATION

CROSS REFERENCE TO RELATED PATENT APPLICATIONS

This application is a national stage application of an international patent application PCT/CN2012/073529, filed Apr. 5, 2012, which is hereby incorporated in its entirety by reference.

BACKGROUND

Increasingly popular online services (e.g., Twitter®, Facebook®, and Foursquare®) provide updated information from various users in a relatively short amount of time. Information available on these services is continuously generated and is far more time-sensitive than mostly static web pages. For example, breaking news appears and is propagated quickly by some of these online services, with new popular activities and hot topics arising constantly from real-time events in the physical world. Although each message or update may be small and contain limited textual content, a data stream may contain rich connections between users, topics, and messages, and these connections may be used to generate important social phenomenon.

SUMMARY

Distributed designs may take a data stream to construct a continuously changing graph structure to capture the relationship existing in the stream. The designs may decouple graph mining from graph updates of the graph structure. A distributed system may separate graph-structure metadata from the application data of the graph structure. An epoch commit protocol may be implemented to generate global consistent snapshots on the graph structure. Based on these consistent snapshots, graph-mining algorithms may be performed to extract timely insights from the stream.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is illustrative algorithm to implement incremental graph-mining computation.

DETAILED DESCRIPTION

Overview

A data stream (e.g., messages, tweets) is received through a set of ingest nodes of a platform. An ingest node of the set of ingest nodes may analyze each incoming feed of the data stream (e.g., a tweet and its associated context) to create a transaction of graph updates, assign a sequence number to the transaction, and distribute the graph updates with the sequence number to a plurality of graph nodes of the platform. The graph nodes may provide a distributed in-memory key/value store, with enhanced graph support. Each of the graph nodes may store graph structure metadata of the data stream separately from associated application data.

In addition, after graph nodes store the graph updates, the ingest node may report a graph update progress in a progress table. Periodically, a snapshot may be taken based on the progress table. This progress table may be used to as a logical clock to define an end of an epoch. Within this epoch, all stored local graph updates may be executed in the graph nodes following a pre-determined order. The execution of graph updates may trigger incremental graph computation on the new snapshot to update associated application data and to extract timely insights from the data stream.

In some instances, the techniques discussed herein may support tolerate failures and decaying, and allow incremental expansion to cope with increasing update rates and computation needs.

The processes and systems described herein may be implemented in a number of ways. Example implementations are provided below with reference to the following figures.

Illustrative of Architecture

Figure 1:
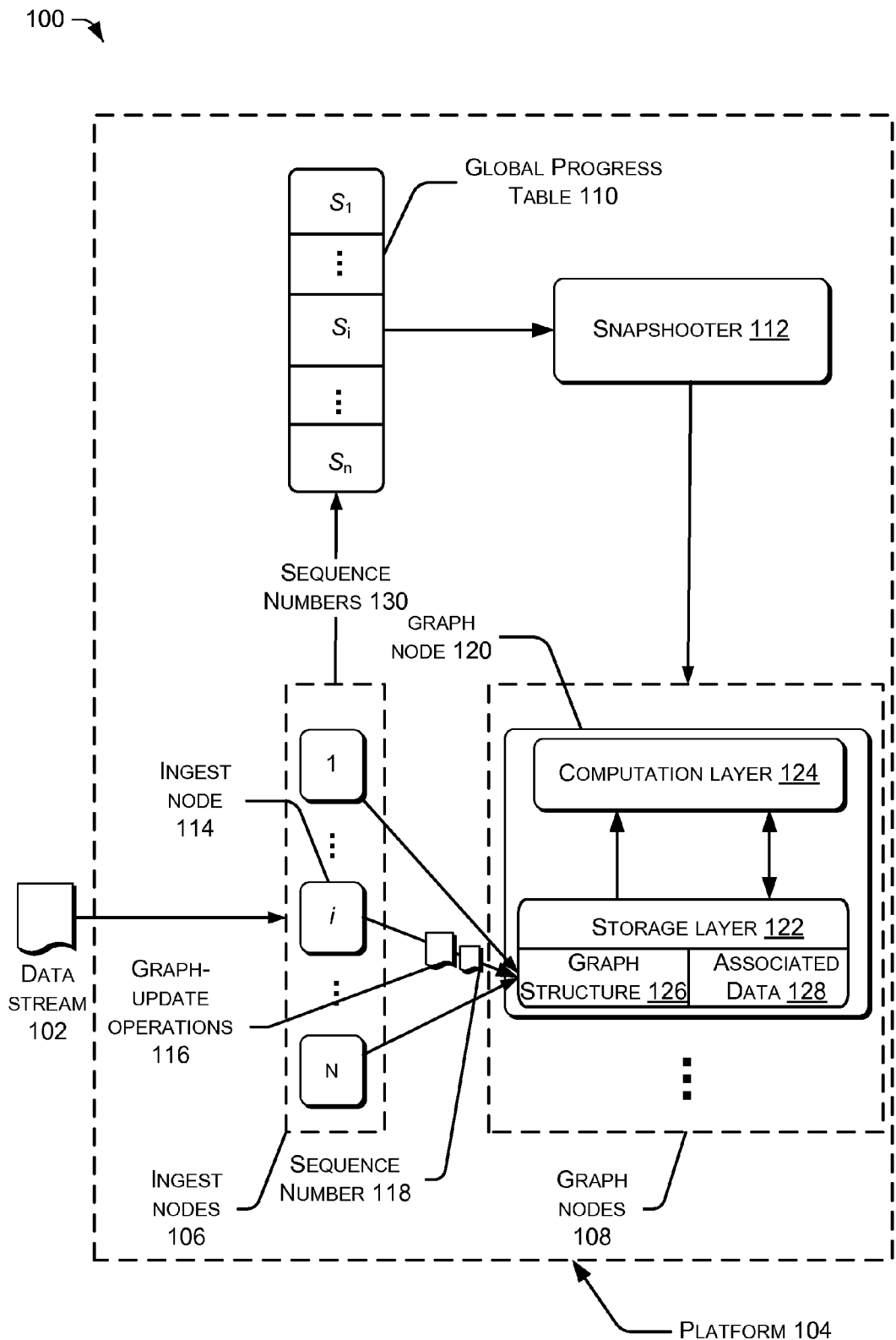
FIG. 1 is a schematic diagram of an illustrative architecture to process streaming data.

FIG. 1 is a schematic diagram of an illustrative architecture 100 to process streaming data. The architecture 100 includes a data stream 102 and a platform 104 for continuous graph update and computation. The platform 104 includes a set of ingest nodes 106, a set of graph nodes 108, a global progress table 110 and a snapshooter 112. The platform 104 may receive the data stream 102 (e.g., messages, tweets) through the ingest nodes 106 including an ingest node 114. The ingest node 114 may analyze each incoming record (e.g., a message and context associated with the message). Based on the analysis, the ingest node 114 may create a transaction of graph-update operations 116. For the transaction, the ingest node 114 may assign a sequence number 118 and distribute the graph-update operations 116 with the sequence number to the graph nodes 108 including a graph node 120.

The graph node 120 may include two layers: a storage layer 122 and a computation layer 124. The storage layer 122 may maintain graph data, and the computation layer 124 may execute incremental graph-mining computations. Specifically, the storage layer 122 may maintain each vertex with an adjacency list as metadata of graph structure 126 and separately store associated data 128 for graph-mining computations. The computation layer 124 may execute the computations based on graph-mining algorithms that operate on the associated data 128.

The graph nodes 108 may store graph updates indicated by graph-update operations sent by the ingest nodes 106. The ingest node 106 may report a graph update progress in the global progress table 110 that may be maintained by a central service. For example, the ingest nodes 106 may mark the global progress table 110 with sequence numbers 140 including multiple sequence numbers. Periodically, the snapshooter 112 may instruct the graph nodes 108 to take a snapshot based on a current vector indicated by sequence numbers in the global progress table 110. The current vector may be used as a global logical clock to define an end of an epoch. After the epoch is defined, the graph nodes 108 may execute and commit all stored local graph updates in this epoch to produce a graph-structure snapshot. In various embodiments, these local graph updates may be executed following a pre-determined order.

After updates in the graph structure 126 due to the epoch, the computation layer 124 may execute incremental graph computations on the new snapshot to update associated values of interest.

Illustrative Creating Consistent Snapshot

Figure 2:
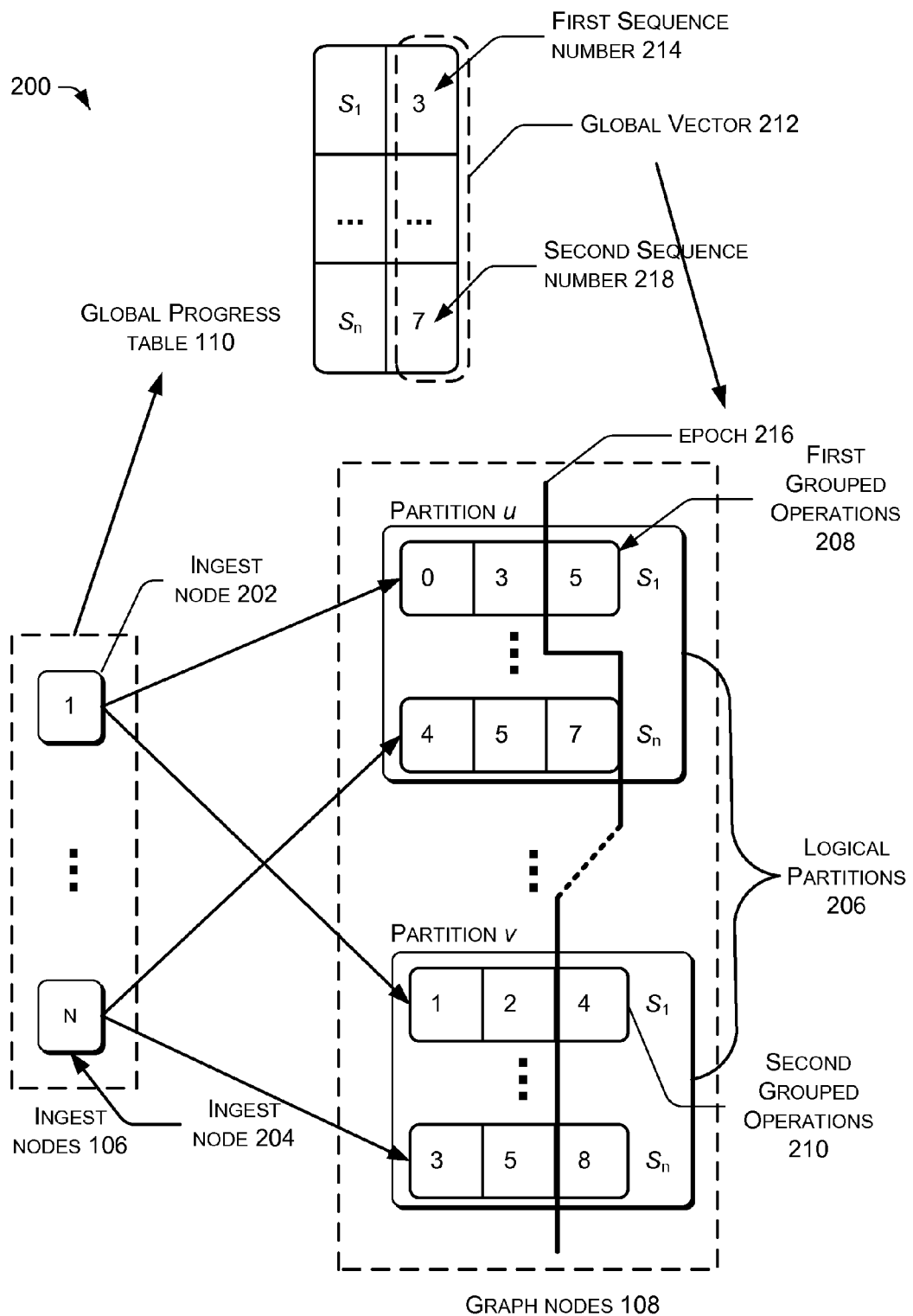
FIG. 2 is a schematic diagram that is used to illustrate an example of creating a consistent snapshot across partitions of graph nodes.

FIG. 2 is a schematic diagram 200 that is used to illustrate an example of creating a consistent snapshot across partitions of the graph nodes 108 of FIG. 1. The consistent snapshot may be created through the cooperation among the ingest nodes 106, the graph nodes 108, the snapshooter 112 and the global progress table 110. In accord with various embodiments, the consistent snapshot mechanism implements an epoch commit protocol that defers applying updates until an epoch is defined, as discussed in the following illustrative processes.

In accordance with various embodiments, an ingest node of the ingest nodes 106 (e.g., an ingest node 202 or an ingest node 204) may turn each incoming record of the data stream 102 into a transaction including a set of graph-update operations that may span logical partitions 206 of the graph nodes 108. For example, these operations may include creating vertex $V_2$, adding an outgoing edge to vertex $V_1$ and adding an incoming edge to vertex $V_2$. Each of those operations can be executed entirely on the graph structure 126 associated with a vertex. In addition, the ingest node may create a continuous sequence of transactions, each with a continuously increasing sequence number. Those sequence numbers may be used to construct a global logical clock to decide which transactions should be included in a snapshot and also used as the identifier for that snapshot.

In various embodiments, a graph may be split into a fixed number (e.g., 512) of the logical partitions 206, which may be further assigned to physical machines of the graph nodes 108. For example, a graph partition may be performed based on the hashing of vertex IDs, and locality considerations may not be necessary. In some embodiments, each of the logical partitions 206 may include a set of vertices, each with a set of directed weighted edges stored in a sorted list. Meanwhile, edges may be considered as part of the graph structure 126, and added and/or modified in the storage layer 122. Each vertex of the set of vertices may also have a set of vertex-fields that store the associated data 128 for algorithms of the graph-mining computation in the computation layer 124. The type of values stored in vertex-filed may be arbitrary as long as it can be serialized.

For example, as illustrated in FIG. 2, the ingest node 202 may send graph-update operations with associated sequence numbers to partition v and partition u respectively. Specifically, in partition u, the corresponding operations may be grouped to generate first grouped operations 208, which may be sorted based on an order of the associated sequence numbers and represented as (0, 3, 5). Similarly, in partition v, the corresponding operations may be grouped and sorted to generate second group operations 210 (i.e., (1, 2, 4)).

Suppose that the ingest node 202 has received acknowledgements from all relevant partitions in the graph nodes 108 (e.g., partition u and partition v) that graph-update operations for all transactions with sequence numbers up to 3 has been received and stored. As a result, the ingest node 202 may update its entry to the "3" first sequence number 214. To initiate a snapshot, the snapshooter 112 may take from the global progress table 110 a global vector 212 (i.e., {3, . . . , 7}) comprising one or more sequence number 118. The global vector 212 may be used as a global logical clock to define the end of an epoch 216. This newly defined epoch may be broadcasted to the graph nodes 108 such that graph updates belonging to the epoch 216 are processed in the same deterministic, but artificial, order in the logical partitions 206. Accordingly, a graph update from the ingest node 202 with a sequence number s is included in the epoch 216, if and only if s is not greater than the "3" first sequence number 214.

Similarly, a graph update from the ingest node 204 with a sequence number s is included in the epoch 216, if and only if s is not greater than the "7" second sequence number 218. In some embodiments, operations on a logical partition are processed in serial, and there may be enough the logical partitions 206 on each graph node, leading to sufficient concurrency at the server level.

In some embodiments, the process of creating a snapshot may continue incoming updates. The ingest nodes 106 may continuously send new graph updates into the graph nodes 108 with higher sequence numbers. The process of the ingest nodes 106 dispatching and the graph nodes 108 storing graph-update operations may overlap with the process of creating snapshots by applying those updates. Therefore, the deferred execution may not affect throughput over a sufficiently long period of time. The consistent snapshot mechanism of this disclosure may effectively batches operations in a small epoch window to strike a balance between reasonable timeliness and be able to handle high incoming rate of updates: the higher the rate, the more effective this batching may be.

The epoch commit protocol may guarantee atomicity in that either all operations in a transaction are included in a snapshot or none of them are included in the snapshot. This may exclude a snapshot that includes one vertex with an outgoing edge, but with no matching incoming edge to the destination vertex. The protocol may further ensures that all transactions from the same ingest node are processed in the sequence-number order. Thanks to the separation of graph updates and graph mining, only simple graph updates may be dealt with when creating consistent snapshots, and, therefore, leveraging the fact that each transaction consists of a set of graph-structure updates that can each be applied on a single vertex structure. For those updates depended on states of other vertices, they may be executed in the graph-mining phase.

In some embodiments, the snapshot mechanism described in this disclosure may ensure consensus on the set of transactions to be included in a snapshot and impose an artificial order within that set, so that all the transactions may be processed in the same order. In some embodiments, the order may be artificial. For example, the graph nodes may be instructed to process updates from the ingest node 114 in a certain sequence number before processing those in order. This externally imposed order may not need to take into account any causal relationship partially because the mechanism separates graph updates from graph mining, and graph updates are usually simple and straightforward. Therefore, the externally imposed order may reflect neither the physical-time order nor any causal order. In various embodiments, different externally imposed orders may be applied, and the resulting graphs may be similar. In some embodiments, vertex creation is made deterministic. For example, if there is a vertex created for each twitter user ID, that vertex may have an internal ID that depends on that twitter user ID deterministically. Accordingly, an edge from or to that vertex may be created before that vertex is created, thereby eliminating cross-operation dependencies.

Illustrative Operation

Figure 3:
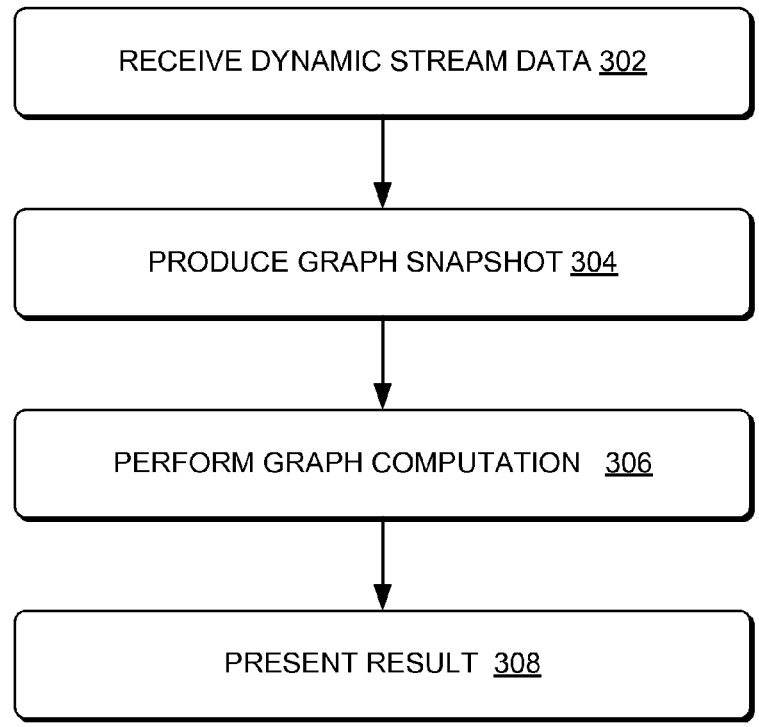
FIG. 3 is a flow diagram of an illustrative process to process streaming data.

FIG. 3 is a flow diagram of an illustrative process to process streaming data. The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, including the processes 400, 500 and 700, in addition to process 400, shall be interpreted accordingly.

At 302, the platform 104 may receive the data stream 102 (e.g., messages and tweets). In some embodiments, the data stream 102 may include dynamics streaming data feeds, which may be continuously generated. The new information of the dynamic streaming data feeds may be more time-sensitive than mostly-static web pages. For example, breaking news may appear and propagate quickly within the dynamic streaming data feeds, and new popular activities and treading topics may arise constantly from real-time events in the physical world. Meanwhile, rich connections between entities such as users, topics, and data feeds may be used to reveal important social phenomena. In some embodiments, the dynamic streaming data feeds may use multiple metadata (e.g., hashtags) to identify controversial information associated with messages.

At 304, the platform 104 may produce a snapshot to define the graph structure data 126 associated with the data stream 102. In some embodiments, the platform 104 may produce consistent distribute snapshots by using the epoch commit protocol, which is described in greater details with reference to FIG. 4 below.

At 306, the platform 104 may perform graph computations to conduct operations (e.g., compiling) application data associated with the graph data 126. In some embodiments, the platform 104 may execute incremental graph-mining such that the computation results may be updated based on recent changes in the data stream 102. These recent changes are reflected in new snapshots. In some embodiments, graph-mining algorithms (e.g., search algorithms and TunkRank algorithm) may operate on a set of vertex fields that store the associated data 128.

At 308, the platform 104 may present computation results to users based on the application data 128. For example, the platform 104 may present search results, user influences, shortest paths between two vertices (e.g., two users) in a graph, and controversial topics that are associated with the data stream 102.

Figure 4:
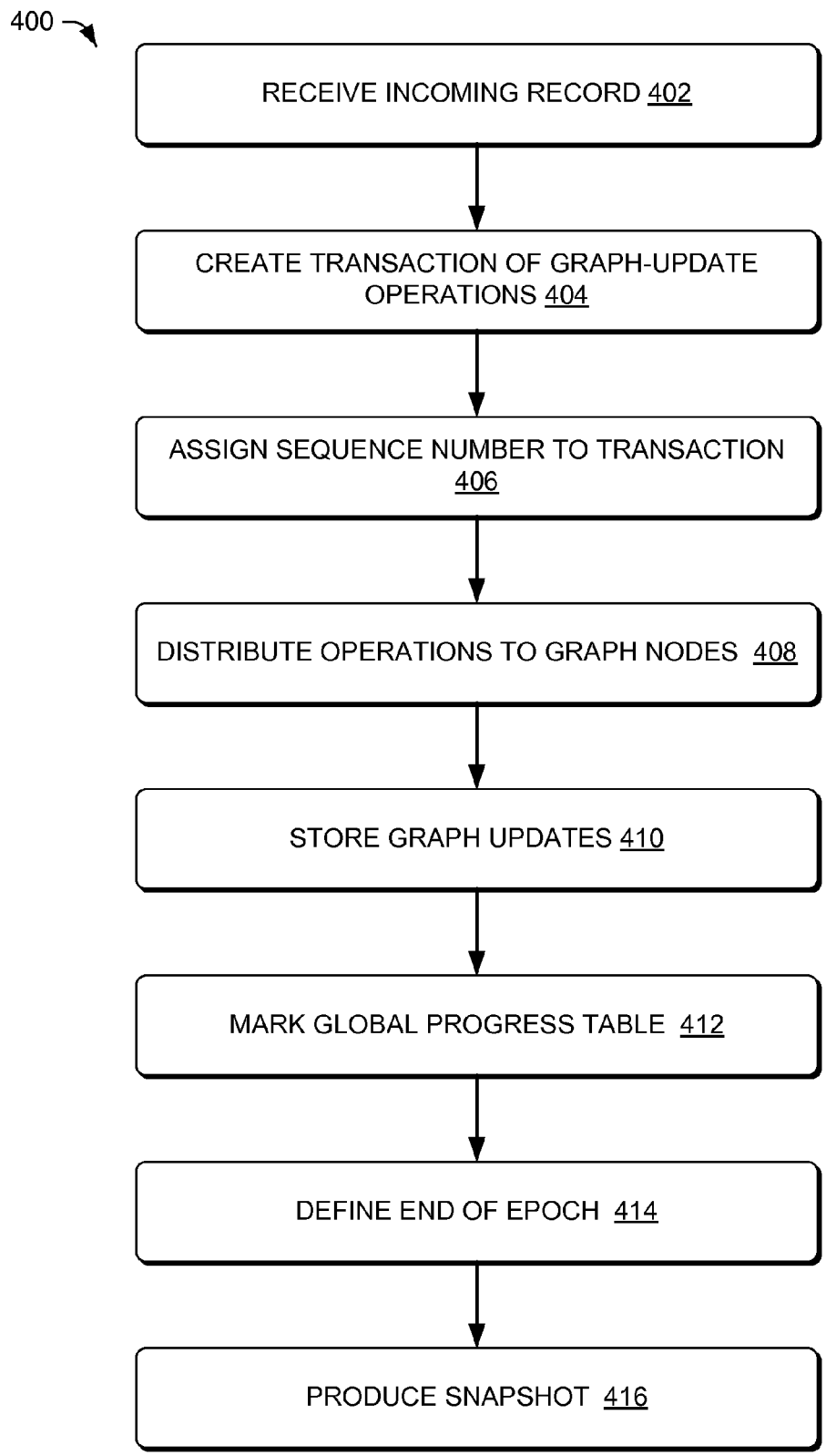
FIG. 4 is a flow diagram of an illustrative process to produce consistent distributed snapshots.

FIG. 4 is a flow diagram of an illustrative process 400 to produce consistent distributed snapshots. At 402, the ingest node 114 may receive an incoming record of the data stream 102 (e.g., a message and context associated with the message). At 404, the ingest node 114 may create a transaction of graph-update operations based on the received record. In some embodiments, the ingest node 114 may define the graph structure 126 by parsing the record, and then produce the transaction including a set of graph operations (e.g., adding edge and/or vertex). In some embodiments, customized graph-update operations (e.g., adding 10% of weighting) may be defined to provide a callback function to be invoked when the operations are applied on the ingest node 114 in generating a snapshot.

At 406, the ingest node 114 may assign the sequence number to the transaction. At 408, the ingest node 114 may distribute operations with the sequence number among the graph nodes. In some embodiments, a set of graph-update operations from the ingest nodes 106 may be sorted and grouped, in the logical partitions 206, to generate operations grouped by original ingest nodes.

At 410, the graph node 120 may store the graph updates from the ingest node 114. In some embodiments, the graph node 120 may maintain each vertex with an adjacency list as metadata of the graph structure 126. Accordingly, the graph updates may modify the metadata that defines the graph structure 126. In some embodiments, the graph node 120 may separately store the associated data 128. In some embodiments, the ingest node 114 may be configured to map a vertex ID to the logical partitions 206, and to assign the logical partitions 206 and their replicates to servers.

At 412, after the graph nodes 108 stores the operations of the transaction, the ingest node 114 may mark a graph update progress in the global progress table 110. The global progress table 110 may record the sequence number for the ingest node 114 to monitor the graph update progress.

At 414, the snapshooter 112 may define an end of the epoch 216 based on the global vector 212 comprising current sequence numbers of each ingest node in the global progress table 110 (e.g., the ingest node 202 and the ingest node 204). The global vector 212 may be used as a global logical clock to define the end of the epoch 216.

At 416, the graph nodes 108 may execute stored local graph updates in the epoch 216 to produce a graph-structure snapshot after the epoch is defined. The snapshooter 112 may broadcast the definition of the epoch 216 to each graph node such that all graph updates in the epoch 216 are processed in the same deterministic order in logical partitions 206.

For example, suppose that an ingest node i updates its entry to sequence number $s_i$ if this ingest node has received acknowledgments from corresponding graph nodes that graph-update operations for transactions up to $s_i$ have been received and stored. Periodically (e.g., 10 seconds), the snapshooter 112 may take from the current global progress table the vector of sequence numbers, (e.g., $s_1, s_2, \ldots, s_n$), where $s_i$ is the sequence number associated with ingest node i. The snapshooter 112 may then use the vector as a global logical (vector) clock to define the end of the current epoch. The decision is broadcasted to all graph nodes, where all graph updates belonging to this epoch are processed in the same deterministic, but artificial, order in all logical partitions. A graph update from ingest node i with sequence number s is included in the current epoch (i.e., $s_1, s_2, \ldots s_n$) if and only if s is not greater than $s_i$ holds.

In some embodiments, updates in the graph structure 126 in response to the defining of the epoch 216 may trigger an incremental graph computation on snapshots to update the associated data 128. Various algorithms may be used to implement the incremental graph computation.

Illustrative Incremental Graph-Mining Computation

As discussed above, the computation layer 124 of the graph nodes 108 may execute incremental graph-mining. Computation results may be updated based on recent changes in the graph. Graph-structure changes may be reflected in new snapshots; graph-mining algorithms may operate on a set of the vertex-fields that store the associated data for the algorithms.

In some embodiments, a vertex-based computation model may be used for graph-mining computation. In this model, the data of interest may be stored along with vertices, and computation proceeds by processing across every vertex. In addition, graph-scale reductions may be used to compute global values, which may be arbitrary complex values (e.g., top X influential users or number of vertices of certain type).

In some embodiments, the platform 104 may implement a hybrid of computation models based on a pull model and a push model with changes to support incremental computation and efficient distributed execution. Under this hybrid model, typically changes in the associated data 128 may propagate in a sub-graph, sparked by changes in the graph structure 126 (e.g., adding an edge).

Figure 5:
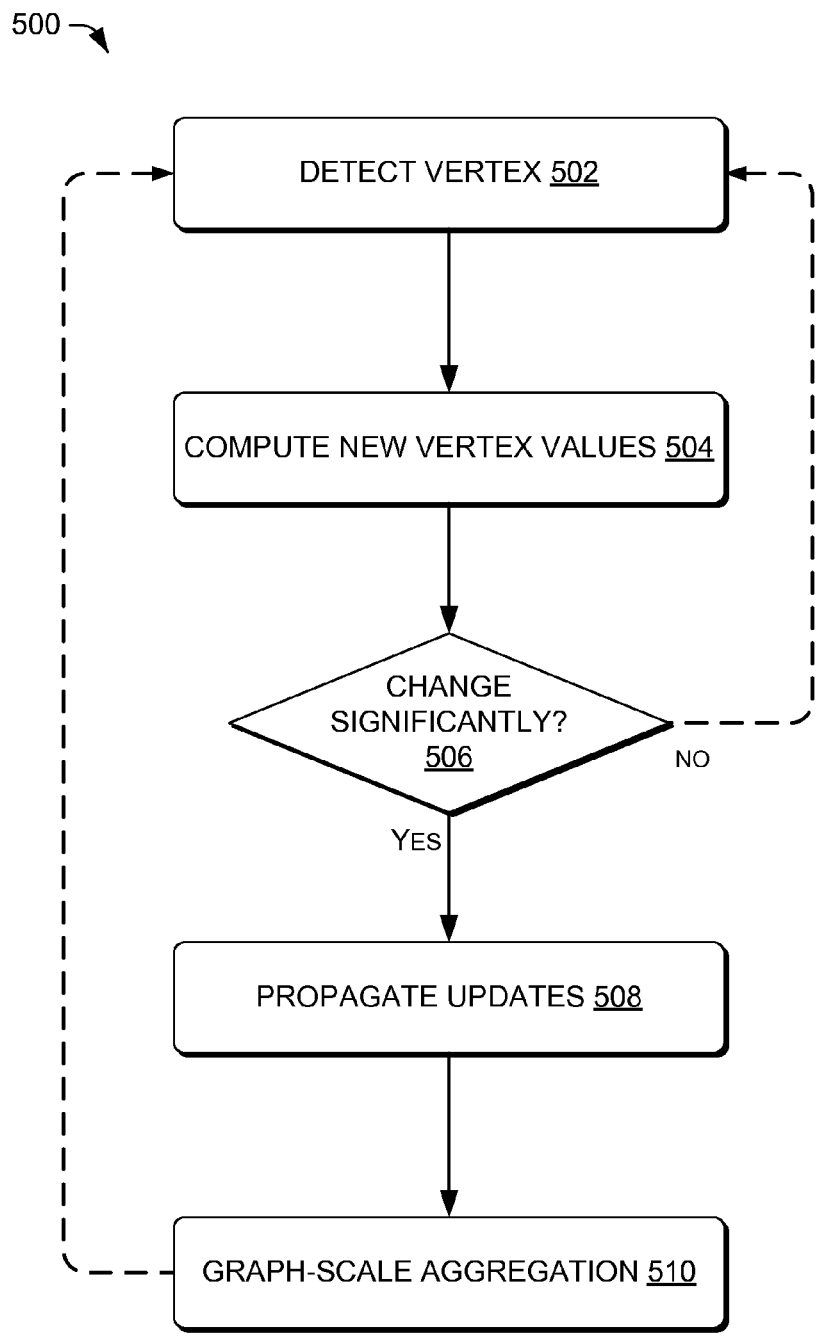
FIG. 5 is a flow diagram of an illustrative process to perform graph-mining computation.

FIG. 5 is a flow diagram of an illustrative process 500 to perform graph-mining computation. At 502, the platform 104 may apply a user-defined rule to check vertex status of the graph structure 126 by comparing the current snapshot to the previous snapshot. If the vertex has been modified (e.g., edges added and values changed), the platform 104, at 504, may invoke a user-specified function to compute a new value associated with the vertex. At 506, the platform 104 may determine whether the value changes significantly, e.g., based on a predetermined rule. If the value does not change significantly (the "NO" branch from decision 506), the operations 502 to 506 may be performed by a loop process (via dashed line form the operation 506 that leads back to the decision 502). If the value changes significantly (the "YES" branch from decision 506), the platform 104 may, at 508, propagate the changes to a set of vertices (e.g, vertices in the neighborhood or vertices defined based on a predetermined rule).

At 510, a graph-scale aggregation of the vertices may be implemented to compute global values using graph-scale reductions. These global values may be arbitrary complex values (e.g., top X influential users or a number of vertices of a certain type). The operations 502 to 510 may be performed by a loop process (via dashed line form the operation 506 that leads back to the decision 502) that may include propagate changes if necessary. In some embodiments, propagation driven by other vertices may change the status of the vertex. In some embodiments, changes in user-defined vertex-fields may propagate in a sub-graph in response to certain changes in the structure of the graph (e.g., adding an edge). The propagation may be terminated when status changes are not detected across all vertices in the graph structure 126.

In the push model, each vertex can send a partial update to another vertex's vertex-field. For example, the pagerank of a vertex is a weighted sum of the pageranks of its neighboring vertices, and each vertex sends its pagerank to its out-neighbors and a system adds them together to form the total pagerank. In incremental algorithms, each vertex may send its incremental change to the value of vertex-field. For example, in the pagerank, each vertex may send the difference of its current and previous pagerank. For the model to work, the updates may be associative and commutative. A feature of the model is the ability to perform sender-side aggregation. For each vertex-field, programmer can define a local aggregation function that combines updates sent by several vertices to a one single update.

Modifications over the push model may enable incremental computation by keeping track of "dirty" fields for a new snapshot and during computation. When a field is declared "dirty", its update function may be invoked. The role of the update function is to "push" its difference of its new value to previous values to neighboring vertices. The platform 104 may keep track of the value that was sent to each of the neighboring vertices to perform incremental calculation.

In some embodiments, processes may be used to not only support the push model, but also provide a way to handle each individual message separately in the vertex update function. In this disclosure, the messages may be handled by the platform and combined by the user-defined aggregation function. Update function may see the final value stored in the vertex-field.

A pull model may be modified for distributed computation. A vertex update function in a pull model may read the values of its neighbor-vertices and produce a new value for itself. If the vertex update function determines the change was significant, it will ask the platform to update its neighbors, and the computation propagates in the graph dynamically. In the platform 104, update function may not be restricted to reading its neighbors, and may want to read neighbors of certain type or an individual vertex (e.g., a newly created vertex). Therefore, for optimal performance, programmers may be suggested to reduce the amount of required vertex information for the update function to perform. In addition, different update functions may need different types of data. In some embodiments, some functions may require a value of a particular vertex-field of a neighboring vertex; but other functions may require more data (e.g., a list of edges of the neighbor).

In some embodiments, the platform 104 may schedule updates to vertices in a way that minimizes network communication. In particular, the platform may combine requests to same vertices, if several update functions request for the same vertex, and execute the updates when all requested data is available. A synchronous model may be executed where the program issues synchronous calls to vertices. Requests may be aggressively batched so there are more chances of merging requests and to reduce the amount of RPC-calls between servers.

In some embodiments, users can define functions that are invoked when there are new vertices or new in/out-edges in a snapshot. These new vertices or new in/out-edges may be used as initialization of incremental graph mining. In the push model, the corresponding vertex-field to dirty may be set to subsequently lead to invoking the update function on the vertex. Similarly, in the pull model, an initialization phase may involve asking the system to prepare the data needed to execute an update function.

In addition to vertex-based computation, the platform 104 may provide a mechanism to compute global values using aggregator functions that execute a distributed reduction over all vertices.

In some embodiments, the platform 104 may also be designed for frequent incremental computation steps. It may adopt a scheduling mechanism. Computation may proceed by executing consecutive super-steps on which every vertex that is scheduled to run is executed by each partition. Computational consistency may not be enforced such that neighboring vertices can be updated in parallel.

In some embodiments, the platform 104 may execute a defined maximum number of super-steps at each snapshot unless the task-queues are empty and there are no vertices to update, which may be an indication of converged computation. The execution model of the platform may also be related to Bulk Synchronous Parallel (BSP) and dynamic scheduling, and global aggregators may be updated after each BSP step.

Illustrative Algorithms

FIG. 6 is illustrative algorithm 600 to implement incremental graph-mining computation. Specifically, the algorithm 600 may be implemented to compute some metric for influence of certain users. The algorithm 600 is used to present various illustrative implementations of features that were discussed above. The following discussion refers to the illustrative algorithm 600 by line numbers 602 shown in the left hand side of the algorithm. The discussion provides various features that may be implemented any order, function, or variation of modules to perform the various features described more generally above. Therefore, the techniques discussed above are not limited by the implementation of the illustrative algorithm 600.

The algorithm 600 may include lines 1-4, which may process a graph of user-vertices with edges connecting users who have mentioned each other. For example, a stronger connection between users based on who mentions who in Twitter may be used. If a tweet contains "@username", it may mean that the submitter of the micro-blog mentions user username (i.e., paying attention to username). In line 5, each EmitOperations may emit two createEdge operations: one for the source to add an outgoing edge and the other for the destination to add an incoming edge. As shown in line 8, code may be added to mark new out-edges and vertex to initiate pushes.

In lines 9-17, updateFunction (vertex) may send the difference of new and previous weighted TunkRank to its neighbors. In line 19, code may be added to perform sum-operation. In line 20, code may be added to detect whether the field has changed enough (dirty) to trigger computation (i.e., updateFunction). In some embodiments, by adjusting a parameter (i.e., E) in the trigger, the algorithm may adjust the accuracy/computation time trade-off. In addition, the algorithm may use a global aggregator object to maintain a list of K most influential users. In some embodiments, we set the $\epsilon$ to 0.001, a value sufficient to find top influential users.

Illustrative Fault Tolerance

Figure 7:
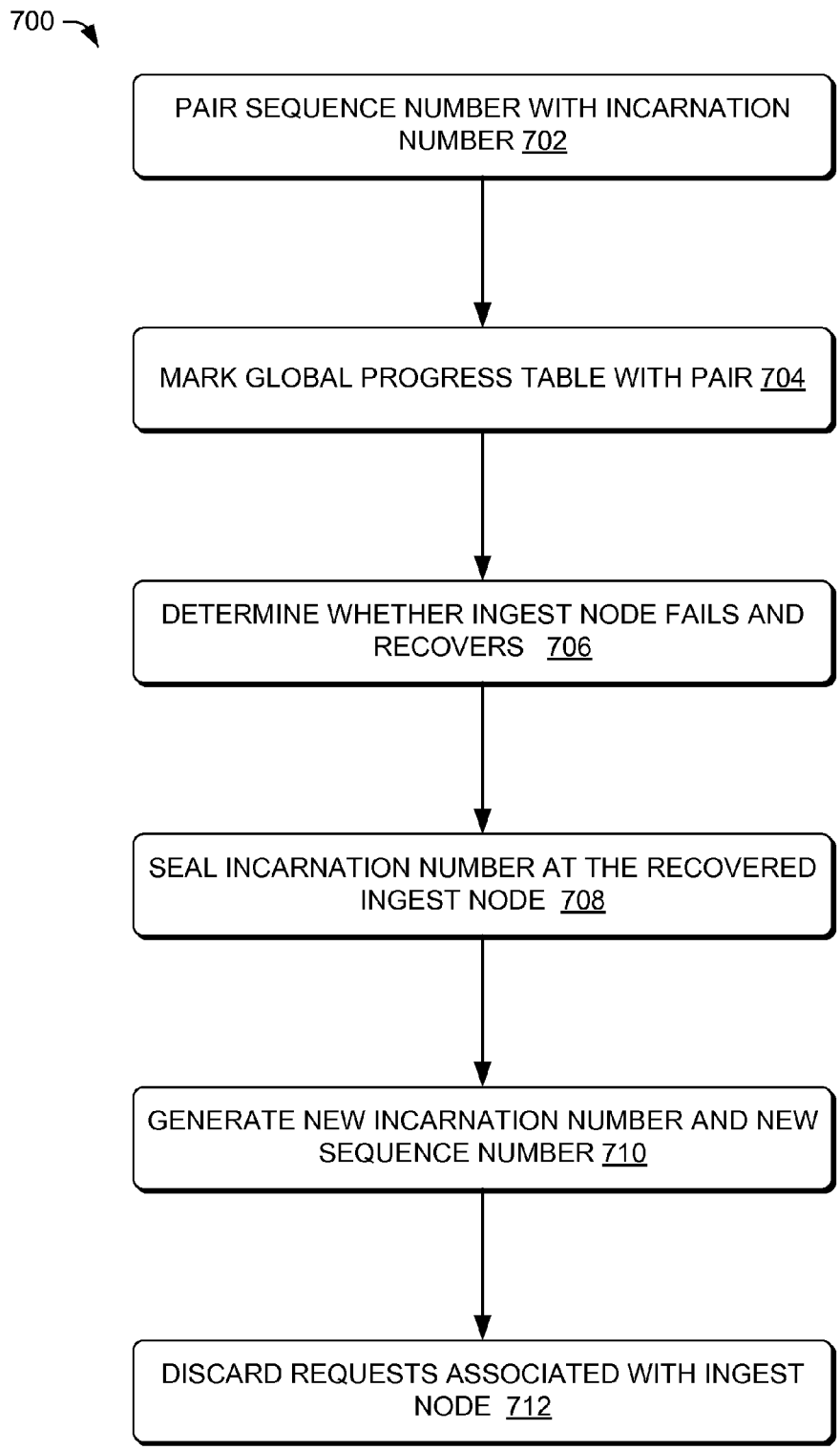
FIG. 7 is a flow diagram of an illustrative process to implement fault tolerance in ingest nodes.

FIG. 7 is a flow diagram of an illustrative process 700 to implement fault tolerance in the ingest nodes 106 of FIG. 1. As discussed above, the epoch commit protocol may assume that each ingest node produce a continuously monotonically increasing sequence numbers for transactions of graph-structure updates. However, it is possible that an ingest node may fail in the middle of sending updates to multiple graph nodes. The platform 104 provides incarnation numbers and leverages the global progress table to address this potential issue.

At 702, the platform 104 may assign an incarnation number to the ingest node 114, and the incarnation number may be paired with a sequence number associated with a transaction in the ingest node 114. Accordingly, sequence numbers may be replaced with pairs (e.g., (c, s)), wherein c is an incarnation number and s is a sequence number. At 704, the pairs may be used in graph structure updates sent to the graph nodes 108, and may be recorded in the global progress table 110.

At 706, the platform 104 may determine whether an ingest node fails and recovers, or whether a new machine takes the role of the failed ingest node. At 708, the recovered ingest node or the replaced ingest node may seal incarnation number if the ingest node fails and recovers, or the new machine takes the role of the failed ingest node. The recovered ingest node may consult the global progress table for the pair including the incarnation number associated with the ingest node and the sequence number associated with the transaction.

At 710, the platform may generate a new incarnation number by adding one to the original incarnation number, and may generate a new sequence number by resetting the sequence number to zero (0) or adding one to the original sequence number.

At 712, the platform may discard operations associated with the ingest node that have sequence numbers being greater than the sequence number. To avoid any loss of transactions, all incoming data feeds may be stored reliably and can only be garbage collected after they have been reflected in the global progress table 110.

For example, when an ingest node fails and recovers, or when a new machine takes the role of a failed ingest node, that resurrected ingest node i may consult the global progress table for the pair ($c_i$, $s_i$) associated with ingest node i. The resurrected ingest node may seal $c_i$ at $s_i$ and use $s_i+1$ as the new incarnation number. This ingest node can reset the sequence number to zero (0) or continue at $s_i+1$. By sealing $c_i$ at $s_i$, all requests with ($c_i$, $s_i$), where $s>s_i$, are considered invalid and discarded.

In some embodiments, the platform may separately handle fault tolerance at the storage layer 122 and at the computation layer 124 by using different mechanisms. At the storage layer 122, graph-update operations need to be stored reliably on graph nodes. The platform may leverage ingest nodes and use a simple quorum-based replication mechanism. Specifically, each logical partition may be replicated on k (e.g., 3) different machines and can tolerate f (e.g., 1) failure, where k≥2f +1 holds. Graph-update operations may then be sent to all replicas, and an ingest node may consider the operation reliably stored as long as f +1 replicas have responded. The ingest node may keep a counter for the number of operations for each logical partition and attach the counter with each operation. A replica can use the counter to identify holes and ask the missing information from other replicas. Replicas may create the same snapshots as they apply the same set of operations in the same order.

In some embodiments, at the computation layer 124, as discussed above, the platform may trigger incremental graph-mining computation on consistent snapshots. Each invocation of computation may take a relatively small amount of time (e.g., order of minutes). Because snapshots are reliably stored with replication at the storage layer, the platform may roll back and re-execute if it encounters any failures in a computation phase. The result of computation can be replicated to tolerate failures. The platform may implement a primary/backup replication scheme, where the primary does the computation and copies the results to the secondaries.

Illustrative Incremental Expansion and Decaying

The scale of the platform 104 may depend on some factors, including the rate of incoming data feeds, the size of the resulting graphs, and the complexity of graph-mining computation. In some embodiments, the platform 104 may recruit more machines into the system in order to handle higher load, larger amount of data, and/or heavier computation. For example, the platform 104 may create a large number of logical partitions up front, and incremental expansion can then be achieved by moving certain logical partitions to new machines. For example, suppose that the platform may want to migrate a logical partition from S to T. The platform 104 may communicate with each ingest node s about the migration and about a promise to send all future operations on that logical partition to both S and T starting from sequence number $t_i$. Once a snapshot with a logical clock ($s_1$, $s_2$, ... $s_n$) satisfying $s_i \geq t_i$ for each $1 \leq i \leq n$ is created, the platform instructs a copy of that snapshot from S to T. Once T receives the snapshot, it has all the information needed to take over the logical partition from S. Because computation overlaps with incoming updates, T can usually catch up with S quickly without causing any performance degradation.

In some embodiments, the value of information decays over time and outdated information may gradually have less and less impact on results. The platform 104 may support decaying by leveraging global logical clocks based on sequence numbers. For example, suppose that information of interest in the last n days and that the information within those n days has a different weight depending on which day it is. The platform 104 may essentially create n+1 parallel graphs to track the last n days and plus the current day. The window may slide when a day passes by. The platform 104 may align those decaying time boundaries with the epochs defined by logical clocks of sequence numbers. When a day passes in the real time, the platform 104 may look at the current epoch number and use this as the boundary. Accordingly, the real graph used for computation may be constructed by taking a weighted average of those parallel graphs.

Illustrative Computing Device

Figure 8:
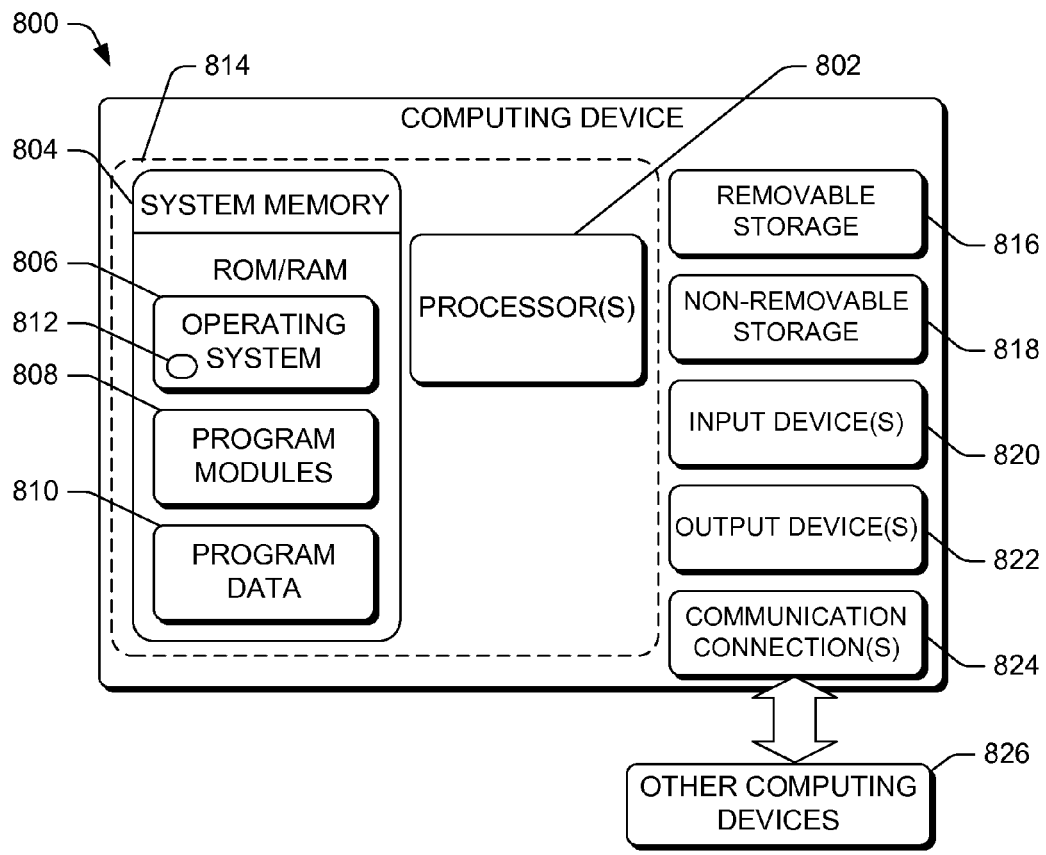
FIG. 8 is a block diagram of an illustrative computing device that may be deployed in the environment shown in FIG. 1.

FIG. 8 shows an illustrative computing device 800 that may be used to implement the platform 104 of FIG. 1 for continuous graph updates and computation. It will readily be appreciated that the various embodiments described above may be implemented in other computing devices, systems, and environments. The computing device 800 shown in FIG. 8 is only one example of a computing device and is not intended to suggest any limitation as to the scope of use or functionality of the computer and network architectures. The computing device 800 is not intended to be interpreted as having any dependency or requirement relating to any one or combination of components illustrated in the example computing device.

In a very basic configuration, the computing device 800 typically includes at least one processing unit 802 and system memory 804. Depending on the exact configuration and type of computing device, the system memory 804 may be volatile (such as RAM), non-volatile (such as ROM, flash memory, etc.) or some combination of the two. The system memory 804 typically includes an operating system 806, one or more program modules 808, and may include program data 810. The operating system 806 includes a component-based framework 812 that supports components (including properties and events), objects, inheritance, polymorphism, reflection, and provides an object-oriented component-based application programming interface (API). The computing device 800 is of a very basic configuration demarcated by a dashed line 814. Again, a terminal may have fewer components but will interact with a computing device that may have such a basic configuration.

The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 816 and non-removable storage 818. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 804, the removable storage 816 and the non-removable storage 818 are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 800. Any such computer storage media may be part of the computing device 800. Moreover, the computer-readable media may include computer-executable instructions that, when executed by the processor(s) 802, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 800 may also have input device(s) 820 such as keyboard, mouse, pen, voice input device, touch input device, etc. Output device(s) 822 such as a display, speakers, printer, etc. may also be included. These devices are well known in the art and are not discussed at length here.

The computing device 800 may also contain communication connections 824 that allow the device to communicate with other computing devices 826, such as over a network. These networks may include wired networks as well as wireless networks. The communication connections 824 are one example of communication media.

It is appreciated that the illustrated computing device 800 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 800 may be implemented in a cloud computing environment, such that resources and/or services are made available via a computer network for selective use by mobile devices.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A computer-implemented method for processing a continuous data stream, the method comprising:
receiving a record of the continuous data stream;
generating, by an ingest node, one or more graph-update operations based on the record;
assigning a sequence number to the one or more graph-update operations;
distributing the one or more graph-update operations with the sequence number to a plurality of graph nodes;
recording the sequence number in a global progress table after the one or more graph-update operations are stored by the plurality of graph nodes, the global progress table comprising a vector including the sequence number and another sequence number assigned by another ingest node that generates and distributes one or more other graph-update operations to the plurality of graph nodes;

defining an end of an epoch based on the global progress table based on the vector; and producing a graph structure snapshot by executing the one or more graph-update operations that are stored in the plurality of graph nodes and are within the epoch and by executing the one or more other graph-update operations.

2. The computer-implemented method as recited in claim 1, wherein the plurality of graph nodes separately store graph structure data and application data that are associated with the continuous data stream.

3. The computer-implemented method as recited in claim 2, further comprising:

updating the graph structure data based on the graph structure snapshot; and in response to the updating the graph structure data, performing an incremental graph computation based on the updated graph structure data and the application data that are stored in the plurality of graph nodes.

4. The computer-implemented method as recited in claim 1, wherein each of the one or more graph-update operations comprise at least one of creating one or more vertices or adding one or more outgoing edges.

5. The computer-implemented method as recited in claim 1, wherein the one or more graph-update operations comprise a customized graph-update operation by adding predetermined weighting to a graph-update operation of the one or more graph-update operations.

6. The computer-implemented method as recited in claim 1, further comprising sending the epoch to each of the plurality of graph nodes to facilitate coordinated processing of the one of more graph-update operations and the one or more other graph-update operations.

7. A computer-implemented method comprising:

receiving, by one or more servers, dynamic streaming data feeds;

querying a global progress table to identify a vector stored in the global progress table, the vector comprising a first sequence number assigned to a first graph-update operation associated with a first ingest node and a second sequence number assigned to a second graph-update operation associated with a second ingest node;

producing a snapshot, based at least in part on the vector, to define graph structure data associated with the dynamic streaming data feeds;

performing graph computation using at least the first graph-update operation and the second graph-update operation to compile application data associated with the graph structure data; and presenting a result based at least in part on the application data.

8. The computer-implemented method as recited in claim 7, wherein the result reflects one or more changes of the dynamic streaming data feeds.

9. The computer-implemented method as recited in claim 7, wherein:

the producing the snapshot of the graph structure data comprises producing the snapshot by using an epoch commit protocol, and the graph computation comprises incremental computation.

10. The computer-implemented method as recited in claim 7, wherein the dynamic streaming data feeds comprise at least a set of continuously generated messages.

11. The computer-implemented method as recited in claim 7, wherein the dynamic streaming data feeds comprise multiple hashtags.

12. The computer-implemented method as recited in claim 7, wherein the first sequence number and the second sequence number are assigned based at least in part on a time when the first graph-update operation and second graph-update operation are identified.

13. The computer-implemented method as recited in claim 7, wherein the producing the snapshot of the graph structure comprises:

creating, based on a data stream, a set of transactions each including one or more operations indicating one or more graph updates associated with the dynamic streaming data feeds;

assigning a set of sequence numbers in an increasing serial order, each of the set of sequence numbers corresponding to a transaction of the set of transactions;

dispatching operations included in the set of transactions to a plurality of graph nodes associated with one or more servers; and producing the snapshot based on the operations and the set of sequence numbers by using an epoch commit protocol.

14. The computer-implemented method as recited in claim 13, wherein the producing the snapshot based on the operations and the set of sequence numbers comprises:

recording a sequence number of the set of sequence numbers after the one or more operations associated with the sequence number are stored in the plurality of graph nodes; and generating the snapshot for the data stream by executing operations associated with sequence numbers that are not greater than the sequence number.

15. The computer-implemented method as recited in claim 13, wherein:

each of plurality of graph nodes comprises:

a storage layer storing the graph structure data, and a computation layer storing the application data; and the dispatching the operations comprises dispatching the operations to storage layers of the plurality of graph nodes.

16. One or more computer-readable media storing computer-executable instructions that, when executed on one or more processors, causes the one or more processors to perform acts comprising:

generating a set of transactions in a time order based on a continuous data stream;

generating, by an ingest node, a set of sequence numbers each associated with a transaction of the set of transactions, the set of sequence numbers being in a serial order;

assigning an incarnation number to the ingest node;

generating a pair including the incarnation number and a certain sequence number of the set of sequence numbers;

recording an update progress by using the pair after one or more transactions of the set of transactions is stored in multiple graph nodes, the one or more transactions each having a sequence number that is not greater than the certain sequence number;

producing, by the multiple graph nodes, a snapshot to update graph structure metadata associated with the continuous data stream by conducting the one or more transactions.

17. The one or more computer-readable media as recited in claim 16, wherein each of the set of transactions comprises one or more operations that are applied to a vertex structure of a graph generated based on the continuous data stream.

18. The one or more computer-readable media as recited in claim 16, where the acts further comprises:
   determining whether the ingest node fails;
   generating a new incarnation number and a new sequence number after the ingest node fails;
   assigning the new incarnation number to the ingest node; and
   discarding one or more transactions of the set of transactions that are associated with the ingest node and have sequence numbers greater than the new sequence number.

19. The one or more computer-readable media as recited in claim 16, wherein the multiple graph nodes separately store graph structure data and application data that are associated with the continuous data stream.

20. The one or more computer-readable media as recited in claim 19, wherein the acts further comprise:
   updating the graph structure data based on the graph structure snapshot; and
   performing an incremental graph computation in response to the updating the graph structure data based on the application data stored in the multiple graph nodes, the performing the incremental graph computation comprising:
   determining that a vertex of the graph structure data is changed based on the graph structure snapshot,
   propagating a corresponding change to the vertex, and
   implementing a graph-scale aggregation to the vertex.

* * * * *